United States Patent [19]

Okaniwa et al.

[11] Patent Number: 5,160,645
[45] Date of Patent: Nov. 3, 1992

[54] GREASE COMPOSITION FOR CONSTANT VELOCITY JOINT

[75] Inventors: Takashi Okaniwa, Fujisawa; Kiyoshi Takeuchi, Odawara; Toshiharu Kato, Kakegawa; Keizo Nagasawa, Iwata, all of Japan

[73] Assignee: NTN Corporation, Osaka, Japan

[21] Appl. No.: 836,544

[22] Filed: Feb. 18, 1992

[30] Foreign Application Priority Data

Apr. 30, 1991 [JP] Japan .................. 3-124524

[51] Int. Cl.$^5$ ............... C10M 141/02; C10M 141/06
[52] U.S. Cl. .................... 252/32.7 E; 252/51.5 A; 252/33.6; 252/25; 252/46.6
[58] Field of Search ........... 252/32.7 E, 33.6, 51.5 A, 252/25, 46.6

[56] References Cited

U.S. PATENT DOCUMENTS

| | | | |
|---|---|---|---|
| 4,436,649 | 3/1984 | Stemke | 252/25 |
| 4,846,983 | 7/1989 | Ward Jr. | 252/33.6 |
| 4,915,860 | 4/1990 | Kinoshita et al. | 252/51.5 R |
| 5,011,617 | 4/1991 | Fagan | 252/51.5 R |
| 5,043,085 | 8/1991 | Kinoshita et al. | 252/51.5 R |

Primary Examiner—Jacqueline Howard
Attorney, Agent, or Firm—Young & Thompson

[57] ABSTRACT

A grease composition for constant velocity joint, particularly Zeppa type joint comprises a base oil and contains (A) a particular diurea compound as a thickener, (B) molybdenum sulfide dialkyldithiocarbamate, (C) an extreme pressure additive of zinc dithiophosphate, (D) a sulfur-phosphorus series extreme pressure additive containing no metallic element and having a sulfur content of 10–30% by weight and a phosphorus content of 0.5–5% by weight, and (E) lead dialkyldithiocarbamate as an essential component.

4 Claims, 3 Drawing Sheets

FIG_1
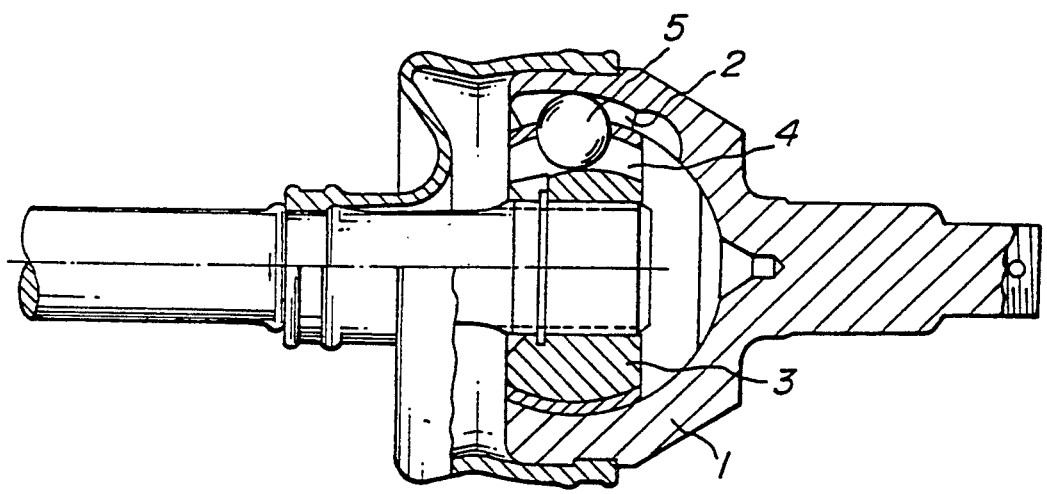

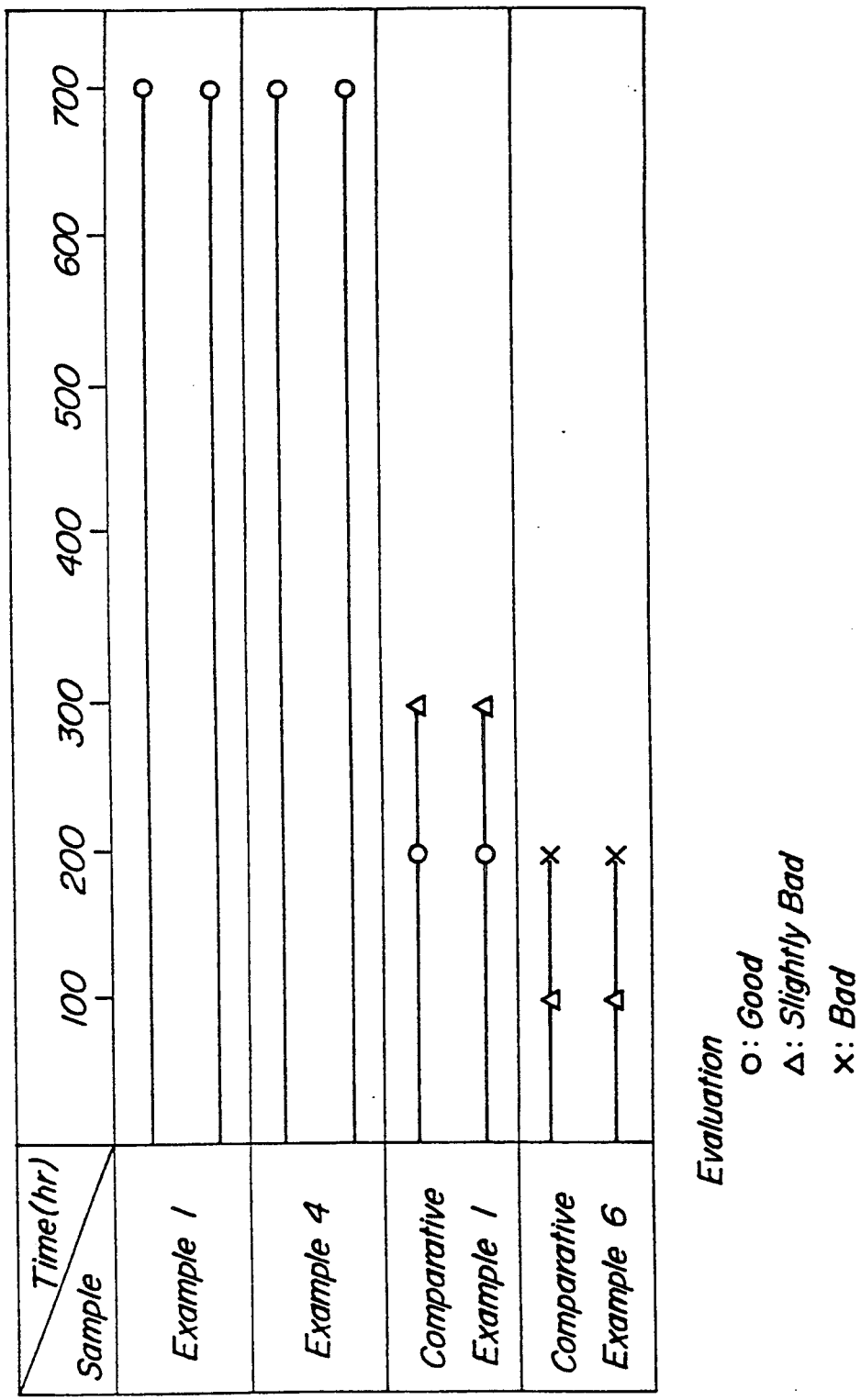

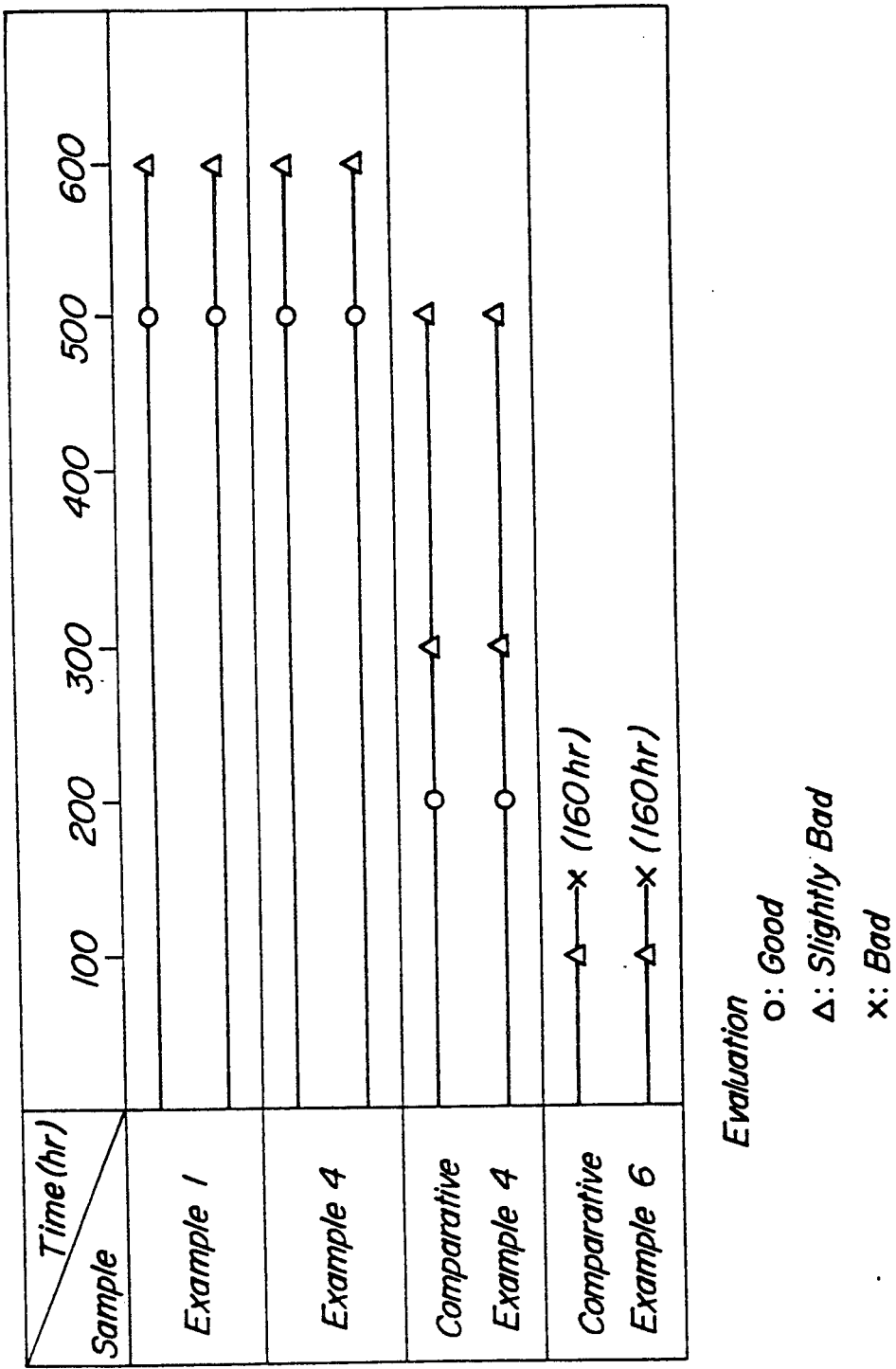

GREASE COMPOSITION FOR CONSTANT VELOCITY JOINT

BACKGROUND OF THE INVENTION

1. Field of the Invention

This invention relates to a grease composition for use in fixed type constant velocity joints of vehicles.

The constant velocity joint is a part transmitting rotating motions at constant velocity even when operating angle variously changes at two intersecting shafts and is used in front-engine, front-wheel drive vehicles (FF vehicle) and 4-wheel drive vehicles (4WD vehicle). In these FF and 4WD vehicles, the transmission of driving force and the steering are carried out by front wheels, so that the use of the constant velocity joint is indispensable for smoothly transmitting the driving force even at a full steering state. In general, the fixed type constant velocity joint is used at a wheel side and is large in the operating angle, so that the lubricating conditions are very severe and the wearing is apt to be caused under a high contact pressure to bring about premature failure.

More particularly, the invention relates to a grease composition for constant velocity joint which can efficiently lubricate at such lubricating places to effectively prevent the wearing and has an excellent durability (flaking resistance).

2. Disclosure of the Related Art

Heretofore, lithium base extreme pressure grease containing sulfur-phosphorus series extreme pressure additive, lithium base extreme pressure grease containing molybdenum disulfide and the like have been used as a grease for the constant velocity joint used at a high contact pressure under wearable condition.

Since the use of FF vehicles as well as functional 4WD vehicles is rapidly increased from a viewpoint of weight reduction, secure of living space and the like, constant velocity joints (CVJ) are widely used in these vehicles. In FIG. 1 is shown a Zeppa type joint used as a fixed type constant velocity joint among these CVJs. When the joint transmits a rotating torque at a state of taking an operating angle in the Zeppa type joint, complicated rolling and sliding motions are created in the fitting of a ball 5 between a track groove 2 of an outer member 1 and a track groove 4 of an inner member 3. In the fixed type constant velocity joints, the lubricating conditions become more severer together with the high output power of engine, high speed of the vehicle and the miniaturization and weight reduction of CVJ. The lithium base extreme pressure grease used from the old time is insufficient in the durability and also is required to improve the heat resistance.

SUMMARY OF THE INVENTION

In the fixed type constant velocity joints used under such severe lubricating conditions, it is firstly required to be excellent in the flaking resistance. The inventors have made evaluations with respect to the presence or absence of flaking and the like in the Zeppa type joint as an actual joint, and found that diurea grease compositions comprising as a base oil at least one lubricating oil selected from mineral oil, synthetic ester oils, synthetic ether oils and synthetic hydrocarbon oils, and as a thickener a diurea compound obtained by reacting an aromatic amine or a mixture of aromatic amine and alicyclic amine with an isocyanate compound, and the invention has been accomplished.

According to the invention, there is the provision of a grease composition for constant velocity joint comprising a base oil, and containing (A) 5-25% by weight of a diurea compound represented by the following general formula:

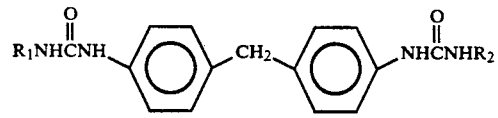

(wherein each of $R_1$ and $R_2$ is an aryl group or a cyclohexyl group having a carbon number of 6, ratio of the aryl group having a carbon number of 6 is 100-25 mol %) as a thickener, (B) 0.5-3% by weight of molybdenum sulfide dialkyldithiocarbamate, (C) 0.5-3% by weight of an extreme pressure additive of zinc dithiophosphate, (D) 0.5-3% by weight of a sulfur-phosphorus series extreme pressure additive containing no metallic element and having a sulfur content of 10-30% by weight and a phosphorus content of 0.5-5% by weight, and (E) 0.5-3% by weight of lead dialkyldithiocarbamate.

BRIEF DESCRIPTION OF THE DRAWINGS

The invention will be described with reference to the accompanying drawings, wherein:

FIG. 1 is a side view partly shown in section of a Zeppa type joint using a grease composition according to the invention in places to be lubricated;

FIG. 2 is a graph showing test results of durable life in Examples 1, 4 and Comparative Examples 1 and 6 under condition I; and FIG. 3 is a graph showing test results of durable life in Examples 1, 4 and Comparative Examples 1 and 6 under condition II.

DESCRIPTION OF THE PREFERRED EMBODIMENTS

In the grease composition according to the invention, at least one lubricating oil selected from mineral oil, synthetic ester oils, synthetic ether oils, synthetic hydrocarbon oils and the like is used as a base oil.

The diurea grease using a diurea compound as the component (A) [diurea grease composition of the invention) is stable in the micellar structure of the thickener even under shearing condition as compared with a diurea grease using an aliphatic amine (aliphatic diurea grease) and Li-soap grease (lithium grease) and the like and strong in the sticking property to metal surface, so that it is considered to be more stronger in the buffering action for obstructing metal contact of the thickener itself.

The component (B) of molybdenum sulfide dialkyldithiocarbamate is a compound represented by the following general formula:

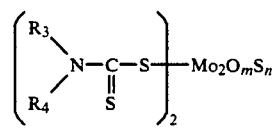

(wherein each of $R_3$ and $R_4$ is an alkyl group having a carbon number of 1-24, m is 0-3, n is 4-1 and m+n is 4), which is a well-known solid lubricant. For example, this compound is disclosed in Japanese Patent Application Publication No. 45-24562 (m=2.35-3, n=1.65-1), Japanese Patent Application Publication No. 51-964 (m=0, n=4) and Japanese Patent Application Publication No. 53-31646 (m=0.5-2.5, n=3.5-1.7), respectively. The component (B) used in the invention includes all of The component (C) used in the invention is an extreme pressure additive of zinc dithiophosphate having the following general formula:

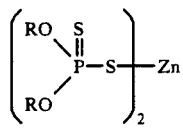

(wherein R is an alkyl group or an aryl group). In such compounds, the group R can be classified into primary alkyl, secondary alkyl and aryl groups in accordance with the kind of alcohol used, but all groups are applicable in the invention.

The sulfur-phosphorus series extreme pressure additive containing no metal element used as a component (D) in the invention has a sulfur content of 10-30% by weight and a phosphorus content of 0.5-5% by weight, and particularly the weight ratio of sulfur to phosphorus is important in the invention. It is known that the sulfur series extreme pressure additive plays a great part for improving a load carrying capacity, while the phosphorus series extreme pressure additive effectively reduces the wearing at a normal wearing region, so that it is considered that the sulfur-phosphorus series extreme pressure additive may develop a combined effect of the above additives. When the sulfur content exceeds the above upper limit, the metal is apt to be corroded, while when the phosphorus content exceeds the upper limit, the effect of reducing the wearing may be lost, so that the sulfur and phosphorus contents should be within the above ranges, respectively. Moreover, Mobilad G-305 made by Mobil Chemical Co. (trade name) having a sulfur content of 21.5% by weight and a phosphorus content of 1.38% by weight and the like may be mentioned as a commercial product of the component (D).

The component (E) of lead dialkyldithiocarbamate is a compound represented by the following general formula:

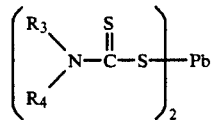

(wherein each of $R_3$ and $R_4$ is an alkyl group having a carbon number of 1-24), which includes a sulfur atom having a high adsorbing activity. It is known that the lead compound easily bonds to metal and forms a lead coating film by replacing iron with lead beneath iron surface or forms lead sulfide or iron sulfide on iron surface in the coexistence of sulfur. Moreover, Vanlube 71, trade name, made by R. T. Vanderbilt Co. in which $R_3$ and $R_4$ are amyl groups and the like may be mentioned as a commercial product of the component (E).

When the amount of the component (B) is less than 0.5% by weight, the amount of the component (C) is less than 0.5% by weight, the amount of the component (D) is less than 0.5% by weight, and the amount of the component (E) is less than 0.5% by weight, there is caused no effect, while when the amount of the component (B) exceeds 3% by weight, the amount of the component (C) exceeds 3% by weight, the amount of the component (D) exceeds 3% by weight, and the amount of the component (E) exceeds 3% by weight, the increase of the effect is not expected and also these amounts are not preferable in economical reasons.

The following examples are given in illustration of the invention and are not intended as limitations thereof.

1. The technical means used for solving the task will concretely be described with reference to Examples and Comparative Examples shown in Table 1.

A. Diurea grease used in the invention

A refined mineral oil having viscosities at 40° C. of 141 cSt and at 100° C. of 13.5 cSt and a viscosity index of 89 was used as a base oil, and a diurea compound obtained by reacting diphenylmethane-4,4'-diisocyanate with a 7:3 mixture of cyclohexylamine and aniline in the base oil was uniformly dispersed into the base oil in an amount of 20% by weight to form a diurea grease.

B. Aliphatic diurea grease

A diurea compound obtained by reacting diphenylmethane-4,4'-diisocyanate with octylamine in the same base oil as in the item A was uniformly dispersed into the base oil in an amount of 10% by weight to form a diurea grease.

C. Lithium grease

Lithium-12-hydroxystearate obtained by reacting 12-hydroxystearic acid with lithium hydroxide in the same base oil as in the item A was uniformly dispersed into the base oil in an amount of 8% by weight to form a lithium grease.

2. Samples of Examples 1-7 and Comparative Examples 1-5 were prepared as follows.

A sample was prepared by adding molybdenum sulfide dialkyldithiocarbamate, zinc dialkyl or diaryl dithiophosphate, sulfur-phosphorus series extreme pressure additive containing no metal element and lead diamyldithiocarbamate to the base grease as mentioned above at a compounding ratio (weight %) shown in Table 1 and then uniformly kneading them. Moreover, commercially available molybdenum disulfide grease was used as Comparative Example 6.

3. Test methods shown in Table 1 were as follows.

| A. | Cone penetration | JIS K 2220 |
|---|---|---|
| B. | Dropping point | JIS K 2220 |
| C. | Shell's 4-ball wearing test | ASTM D 2266 |
|  | Conditions; rotating number: | 1200 rpm |
|  | load: | 40 kgf |
|  | temperature: | 75° C. |
|  | time: | 1 hour |
| D. | Test for durable life | |

The test for durable life was carried out by filling the sample in a Zeppa type joint as a fixed type constant velocity joint and testing on a table under the following conditions to evaluate the presence or absence of flaking and the like.

The test results of the samples in Example 1, 4 and Comparative Examples 1 and 6 under the condition I are shown in FIG. 2, and the test results of the samples in Example 1, 4 and Comparative Examples 1 and 6 under the condition II are shown in FIG. 3.

|  | Condition I | Condition II |
|---|---|---|
| Rotating number (rpm) | 200 | 1000 |
| Torque (kgf.m) | 125 | 45.0 |
| Operating angle (°) | 5 | 7 |
| Joint size | #95 | #100 |

TABLE 1(a)

|  | Example 1 | Example 2 | Example 3 | Example 4 | Example 5 | Example 6 | Example 7 |
|---|---|---|---|---|---|---|---|
| Composition (weight %) | | | | | | | |
| Base grease | | | | | | | |
| diurea grease used in the invention *1 | 95.0 | 95.0 | 95.0 | 95.5 | 95.5 | 95.5 | 95.5 |
| aliphatic diurea grease | — | — | — | — | — | — | — |
| lithium grease | — | — | — | — | — | — | — |
| Additives | | | | | | | |
| molybdenum sulfide dialkyldithiocarbamate | 2.0 | 2.0 | 2.0 | 3.0 | 0.5 | 0.5 | 0.5 |
| zinc dithiophosphate I (R: primary alkyl) | 1.0 | — | — | 0.5 | 3.0 | 0.5 | 0.5 |
| zinc dithiophosphate II (R: secondary alkyl) | — | 1.0 | — | — | — | — | — |
| zinc dithiophosphate III (R: aryl) | — | — | 1.0 | — | — | — | — |
| sulfur-phosphorus series extreme pressure additive containing no metal element | 1.0 | 1.0 | 1.0 | 0.5 | 0.5 | 3.0 | 0.5 |
| lead diamyldithiocarbamate | 1.0 | 1.0 | 1.0 | 0.5 | 0.5 | 0.5 | 3.0 |
| total | 100 | 100 | 100 | 100 | 100 | 100 | 100 |
| Cone penetration 60 W | 320 | 323 | 326 | 321 | 325 | 321 | 327 |
| Dropping point °C. | 260< | 260< | 260< | 260< | 260< | 260< | 260< |
| Shell's four ball wearing test (1200 rpm, 40 kgf, 75° C., 1 hr) | 0.37 | 0.39 | 0.39 | 0.39 | 0.40 | 0.39 | 0.40 |
| **Evaluation of durability *2** | | | | | | | |
| condition I | ⊙ | ⊙ | ⊙ | ⊙ | ⊙~○ | ⊙~○ | ⊙~○ |
| condition II | ⊙ | ⊙ | ⊙ | ⊙ | ⊙~○ | ⊙~○ | ⊙~○ |

*1 diurea grease shown in Examples in which ratio of cyclohexyl group to aryl group is 7:3
*2 ⊙: no flaking after 500 hours
○: flaking in 500 hours
Δ: flaking in 300 hours
x: flaking in 100 hours

TABLE 1(b)

|  | Comparative Example 1 | Comparative Example 2 | Comparative Example 3 | Comparative Example 4 | Comparative Example 5 | Comparative Example 6 |
|---|---|---|---|---|---|---|
| Composition (weight %) | | | | | | |
| Base grease | | | | | | |
| diurea grease used in the invention *1 | 97.0 | 97.0 | 96.0 | — | — | Commercially available molybdenum disulfide grease |
| aliphatic diurea grease | — | — | — | 95.0 | — | |
| lithium grease | — | — | — | — | 95.0 | |
| Additives | | | | | | |
| molybdenum sulfide dialkyldithiocarbamate | 2.0 | 2.0 | 2.0 | 2.0 | 2.0 | |
| zinc dithiophosphate I (R: primary alkyl) | 1.0 | — | 1.0 | 1.0 | 1.0 | |
| zinc dithiophosphate II (R: secondary alkyl) | — | — | — | — | — | |
| zinc dithiophosphate III (R: aryl) | — | — | — | — | — | |
| sulfur-phosphorus series extreme pressure additive containing no metal element | — | — | 1.0 | 1.0 | 1.0 | |
| lead diamyldithiocarbamate | — | 1.0 | — | 1.0 | 1.0 | |
| total | 100 | 100 | 100 | 100 | 100 | |
| Cone penetration 60 W | 321 | 325 | 320 | 327 | 322 | 285 |
| Dropping point °C. | 260< | 260< | 260< | 235 | 192 | 190 |
| Shell's four ball wearing test (1200 rpm, 40 kgf, 75° C., 1 hr) | 0.49 | 0.51 | 0.52 | 0.49 | 0.55 | 0.75 |
| **Evaluation of durability *2** | | | | | | |
| condition I | Δ | Δ | Δ | ○~Δ | x | x |
| condition II | Δ~x | Δ~x | Δ | Δ | Δ | x |

*1 diurea grease shown in Examples in which ratio of cyclohexyl group to aryl group is 7:3
*2 ⊙: no flaking after 500 hours
○: flaking in 500 hours
Δ: flaking in 300 hours
x: flaking in 100 hours As seen from Table 1 and FIGS. 2 and 3, the remarkable effects are particularly obtained when using the grease compositions according to the invention.

That is, the grease composition for constant velocity joint according to the invention comprises (A) 5-25% by weight of a diurea compound represented by the following general formula:

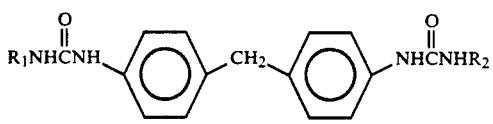

(wherein each of $R_1$ and $R_2$ is an aryl group or a cyclohexyl group having a carbon number of 6, and ratio of the aryl group having a carbon number of 6 is 100-25 mcl %) as a thickener, (B) molybdenum sulfide dialkyldithiocarbamate, (C) an extreme pressure additive of zinc dithiophosphate represented by the following general formula:

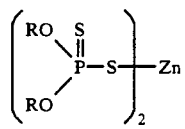

(wherein R is an alkyl or aryl group), (D) a sulfurphosphorus series extreme pressure additive containing no metallic element and having a sulfur content of 10-30% by weight and a phosphorus content of 0.5-5% by weight, and (E) lead dialkyldithiocarbamate as an essential component, which can attain the improvement of the durable life in a Zeppa type joint as a fixed type constant velocity joint.

What is claimed is:

1. A grease composition for constant velocity joint comprising a base oil, and containing (A) 5-25% by weight of a diurea compound represented by the following general formula:

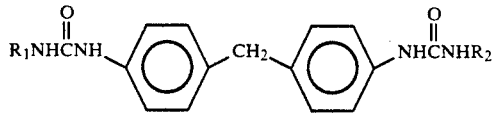

wherein each of $R_1$ and $R_2$ is an aryl group or a cyclohexyl group having a carbon number of 6, and ratio of the aryl group having a carbon number of 6 is 100-25 mol % as a thickener, (B) 0.5-3% by weight of molybdenum sulfide dialkyldithiocarbamate, (C) 0.5-3% by weight of an extreme pressure additive of zinc dithiophosphate represented by the following general formula:

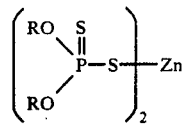

wherein R is an alkyl group or an aryl group, (D) 0.5-3% by weight of a sulfur-phosphorus series extreme pressure additive containing no metallic element and having a sulfur content of 10-30% by weight and a phosphorus content of 0.5-5% by weight, and (E) 0.5-3% by weight of lead dialkyldithiocarbamate.

2. A grease composition according to claim 1, wherein said component (B) is a solid lubricant represented by the following general formula:

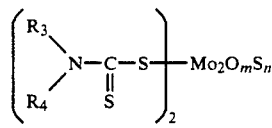

wherein each of $R_3$ and $R_4$ is an alkyl group having a carbon number of 1-24, m is 0-3, n is 4-1 and m+n is 4.

3. A grease composition according to claim 1, wherein said alkyl group of the formula in said component (C) is a primary or secondary alkyl group.

4. A grease composition according to claim 1, wherein said component (E) is a compound represented by the following general formula:

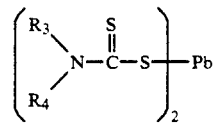

wherein each of $R_3$ and $R_4$ is an alkyl group having a carbon number of 1-24.

* * * * *